Dec. 22, 1959     H. F. OLSON ET AL     2,918,667
SIGNAL FREQUENCY CHANGE DETECTOR

Filed April 1, 1957     3 Sheets-Sheet 1

INVENTORS.
*Harry F. Olson &*
*Herbert Belar*
BY
ATTORNEY

Dec. 22, 1959  H. F. OLSON ET AL  2,918,667
SIGNAL FREQUENCY CHANGE DETECTOR
Filed April 1, 1957  3 Sheets-Sheet 2
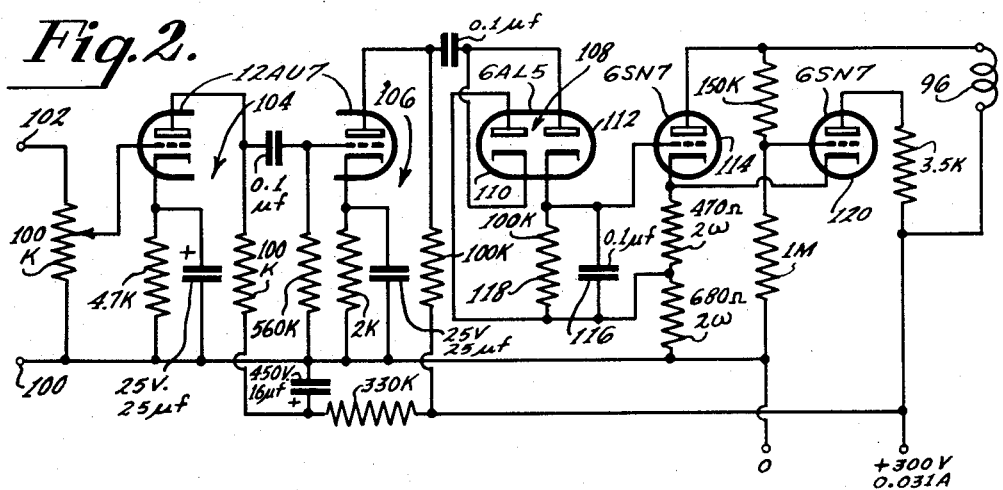
*Fig. 2.*
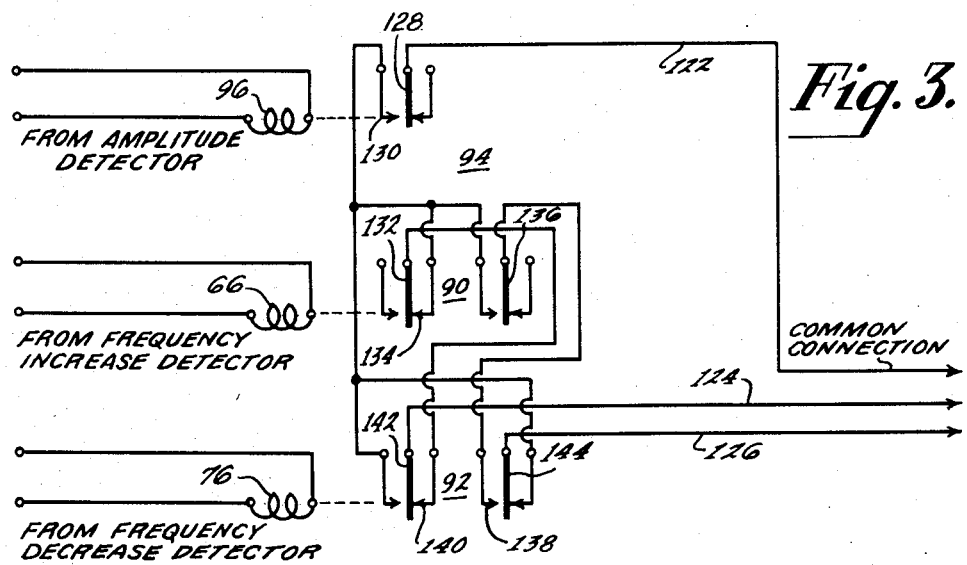
*Fig. 3.*
*Fig. 4.*
|  | CODE | OPERATE RELAYS |
|---|---|---|
| NO SOUND | ○ ○ | NONE |
| INCREASING FREQUENCY | ● ○ | 96, 66 |
| DECREASING FREQUENCY | ○ ● | 96, 76 |
| STEADY FREQUENCY | ● ● | 96 |
○ = LIGHT OUT
● = LIGHT ON
INVENTORS.
*Harry F. Olson &*
*Herbert Belar*
BY
*Morrish Rebban*
ATTORNEY.

Dec. 22, 1959   H. F. OLSON ET AL   2,918,667
SIGNAL FREQUENCY CHANGE DETECTOR
Filed April 1, 1957   3 Sheets-Sheet 3
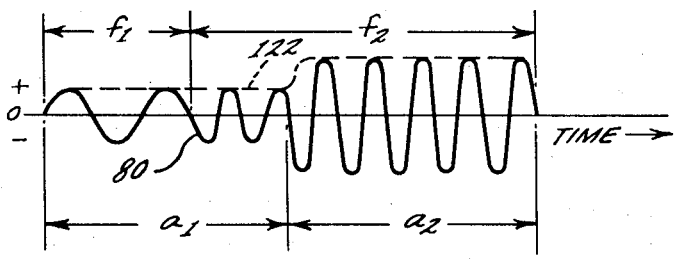
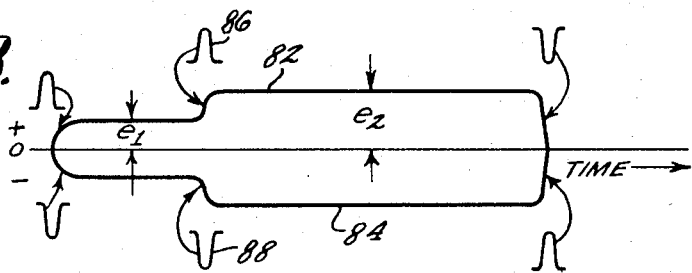
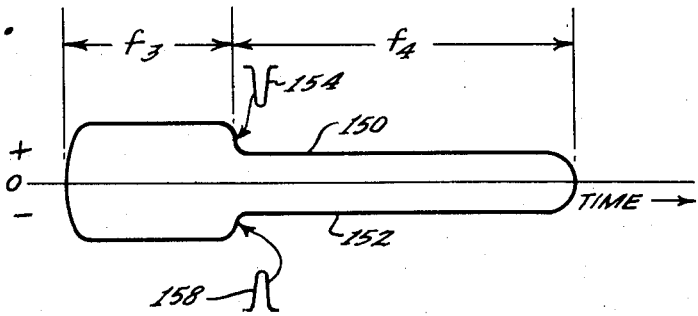
INVENTORS.
Harry F. Olson &
Herbert Belar
BY
ATTORNEY.

United States Patent Office 2,918,667
Patented Dec. 22, 1959

2,918,667

SIGNAL FREQUENCY CHANGE DETECTOR

Harry F. Olson, Princeton, and Herbert Belar, Palmyra, N.J., assignors to Radio Corporation of America, a corporation of Delaware Application April 1, 1957, Serial No. 649,732

12 Claims. (Cl. 340—253)

This invention relates to apparatus for indicating changes in the frequency of a signal with respect to time, and more particularly to means for determining the direction of the rate of change of the frequency of a discrete, periodic signal.

Audio signals of the type derived from human speech have been analyzed for many of their characteristics. The information thus obtained has been coded for the purpose of reproducing these sounds electrically. It has been proposed, for example, to divide the frequency spectrum of sounds into relatively narrow frequency bands, and to set up a matrix, from these bands, of frequency vs. time for decoding purposes.

It has been observed that the same word, when spoken by different people, results in different codes. It has been noted, however, that for certain sounds comprising more than one frequency, the direction in which the formant frequencies change are the same regardless of the person making the sound. In the frequency spectrum between 1,200 and 2,400 cycles per second, for example, the formant frequencies for the word "You" decrease for all the speakers that have been tested. Within the same frequency range, it has also been demonstrated that the formant frequencies for the word "I" increase with time. There are many other words and basic sounds that show either a consistent increase or a consistent decrease in frequency with time within specified frequency bands of the frequency spectrum. An indication of the increase or decrease in frequency with time of a sound, or word, is an additional piece of information that may be used to identify the sound for analytical purposes.

Accordingly, it is a principal object of the present invention to provide apparatus for indicating a change in the frequency with respect to time of a signal having a component wave of varying frequency.

It is another object of the present invention to provide means for indicating the direction of the rate of change of the frequency of a signal of varying frequency.

A further object of the present invention is to provide means for coding changes in the frequency of a signal with respect to time.

Still another object of the present invention is to provide means for indicating whether a signal is increasing or decreasing in frequency, and to eliminate such indications that are inherent in the beginning and in the end of each discrete signal.

These objects and related advantages of the present invention are attained in an improved signal frequency change detector adapted to provide an indication of the direction of the rate of change of an audio signal. The signal whose frequency change is to be determined is applied to the input of the frequency change detector wherein the signal is amplified and limited to provide waves of constant amplitude. These waves of constant amplitude are applied to a double diode, through a resistance-capacitance network having a relatively short time constant, for the purpose of deriving positive and negative pulses proportional in frequency to the frequency of the waves. The output from each diode is through a resistance-capacitance network having a relatively long time constant to provide the positive and the negative envelopes of the positive and negative pulses. Means are provided to differentiate both the positive and negative envelopes to obtain impulses when there is a change in the amplitude of the envelope, representative of a change in the frequency of the signal. The impulses from the positive and negative envelopes are applied to separate relays respectively, in an output circuit, in a manner whereby each of the relays is actuated by impulses of positive polarity only. Indicating means such as lamps, in the output circuit indicate the direction of the rate of change of frequency in accordance with the operating position of each of the relays.

An increase in the frequency of a signal, for example, will provide a positive-going impulse from its positive envelope and a negative-going impulse from its negative envelope. Conversely, a signal whose frequency decreases provides a negative-going impulse from its positive envelope, and a positive-going impulse from its negative envelope. The relays to which these pulses are applied are interconnected in the output circuit to provide characteristic output means in accordance with the actuation of the relays. An additional relay connected in the output circuit may be provided to switch the circuit off at the beginning and at the end of each signal. Thus, the change in frequency inherent in every signal in the beginning and at the end thereof will not be indicated.

The novel features of the present invention, as well as the invention itself, both as to its organization and method of operation, will be understood in detail from the following description when considered in connection with the accompanying drawings in which similar reference characters represent similar components, and in which:

Fig. 2 is a schematic diagram of apparatus to determine the amplitude of the envelope of the signal whose change in frequency is to be indicated, in accordance with the present invention;

Fig. 3 is a schematic diagram of a coder for the frequency change detector, in accordance with the present invention;

Fig. 4 is an explanation of the code used to indicate a change in frequency of a signal, in accordance with the present invention, and Figs. 5A, B and C are waveforms used to explain the signal frequency change detector of the present invention.

Figure 1:
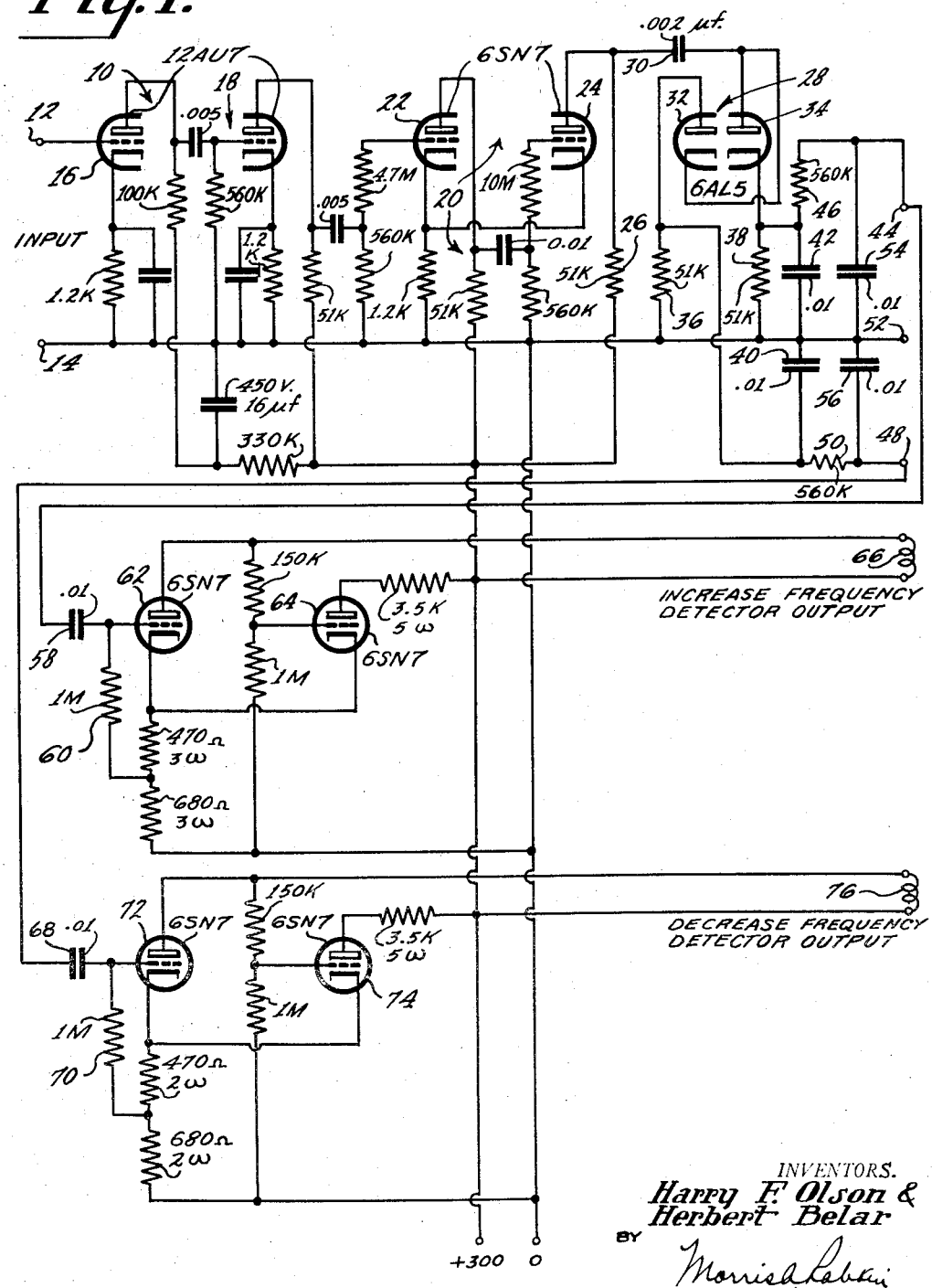
Fig. 1 is a schematic diagram of apparatus, in accordance with the present invention, for deriving impulses from a signal of varying frequency to determine the direction of change in frequency of the signal.

Referring now to Fig. 1, there are shown means for deriving two impulses of opposite polarity from a discrete, periodic signal when there is a change in the frequency of the signal. The signal whose change in frequency is to be determined is applied to an amplifier circuit 10 through a pair of input terminals 12 and 14. The input terminal 12 is connected to the grid of an amplifier tube 16, and the input terminal 14 is connected to a common circuit connection. The output of the amplifier circuit 10 is capacitively coupled to a second amplifier circuit 18 where the signal is further amplified.

The output of the amplifier circuit 18 is capacitively coupled to an overdriven amplifier circuit 20 comprising the tubes 22 and 24. The overdriven amplifier circuit 20 functions to convert the amplified signal into square waves of substantially constant amplitude. The anode of the tube 24 is connected to a source of positive operating potential through a load resistor 26.

The output from the overdriven amplifier tube 24, that is, the square waves of substantially constant amplitude, is applied to a double diode rectifier circuit 28 through a relatively small capacitor 30. The double-diode rectifier circuit 28 comprises rectifiers 32 and 34 connected back-to-back. The anode of the rectifier 32 is connected to the common terminal 14 through a load resistor 36, and the cathode of the rectifier 34 is connected to the common terminal 14 through a cathode resistor 38. The capacitor 30 is connected to the cathode of the diode 32 and to the anode of the diode 34. The capacitance of the resistor 30 is relatively small and, therefore, causes the resistance-capacitance network of which it is a part to have a relatively short time constant. Thus, negative pulses that are proportional in frequency to the frequency of the square waves are derived at the anode of the rectifier 32. In a similar manner, positive pulses proportional in frequency to the square waves are obtained at the cathode of the diode 34. A capacitor 40 is connected between the anode of the diode 32 and the common terminal 14, and a capacitor 42 is connected between the cathode of the diode 34 and the common terminal 14. The capacitors 40 and 42 form resistance-capacitance networks with the resistors 36 and 38, respectively, that have relatively long time constants.

The cathode of the diode 34 is connected to an output terminal 44, through a resistor 46. The anode of the diode 32 is connected to an output terminal 48 through a resistor 50. The output terminals 44 and 48 are connected to a common output terminal 52 through capacitors 54 and 56, respectively. The common output terminal 52 is connected to the common input terminal 14. It will now be understood that a positive envelope of the positive pulses, proportional in amplitude to their frequency, is obtained between the output terminals 44 and 52. In a similar manner, a negative envelope of the negative pulses, proportional in amplitude to their frequencies, is obtained between the output terminals 48 and 52.

Means are provided to derive an impulse from each of the output envelopes, between the output terminals 44 and 52, and between the output terminals 48 and 52, when there is a change in the amplitude of the envelopes, that is, when there is a change in the frequency of the original signal. To this end, the positive envelope obtained between the output terminals 48 and 52 is differentiated by a resistance-capacitance network comprising, in part, a capacitor 58 and a resistor 60. The differentiated signal is applied to the grid of a normally cut-off tube 62. The normally cut-off tube 62 is connected in parallel with a normally conducting tube 64. The anode of the tube 62 is connected to a source of positive operating potential through a relay coil 66. The cathodes of the tubes 62 and 64 share a common cathode resistor in a manner whereby the tube 64 will be cut off when the tube 62 is caused to conduct, as when the differentiated impulse applied to the tube 62 is positive. The reason for the parallel arrangement of the tubes 62 and 64 is to provide a balanced load on the power supply.

The negative envelope, is differentiated by a resistance-capacitance network comprising, in part, a capacitor 68 and a resistor 70. The differentiated impulses, indicating changes in the frequency of the original signal, are applied to a normally cut-off tube 72. The tube 72 is connected in parallel with a normally conducting tube 74 in order to keep the load on the power supply balanced, as explained for the tubes 62 and 64. The anode of the tube 72 is connected to a source of operating potential through a relay coil 76. It will now be understood that a positive-going impulse applied to the grid of the tube 72 will cause it to conduct, and cause the tube 74 to be cut-off, as explained above for the tubes 62 and 64.

It will be noted that the relay coils 66 and 76 are actuated only upon the application of positive-going impulses to the tubes 62 and 72, respectively.

The operation of the frequency change detector shown in Fig. 1 will now be explained. Let it be assumed that a discrete audio signal 80, as shown in Fig. 5A, is applied between the input terminals 12 and 14. Let it be assumed that a first portion of the signal 80 comprises a relatively low frequency $f_1$ and the latter portion comprises a relatively higher frequency $f_2$, as shown in Fig. 5A. Let it also be assumed that the amplitude of the first one-half of the signal 80 is a relatively small amplitude of $a_1$, and the amplitude of the second half of the signal 80 is a relatively greater amplitude of $a_2$. The signal 80 is amplified by the amplifier circuits 10 and 18, and limited to square waves of constant amplitude by the overdriven amplifier circuit 20 to provide square waves of constant amplitude at the anode of the tube 24. Positive pulses proportional in frequency to the frequency of the square waves are obtained at the cathode of the diode 34 of the double-diode rectifying circuit 28. Negative pulses proportional in frequency to the frequency of the square waves are obtained at the anode of the diode 32. A positive envelope 82, as shown in Fig. 5B, of the aforementioned positive pulses is obtained between the output terminal 44 and common output terminal 52. In a similar manner, a negative envelope 84, as shown in Fig. 5B, of the aforementioned negative pulses is obtained between the output terminal 48 and the common output terminal 52.

Increases in the amplitude of the positive and negative envelopes 82 and 84 will result in positive-going and negative going pulses 86 and 88, respectively, when the frequency increases from $f_1$ to $f_2$. The positive-going pulse 86 is applied to the grid of the normally cut-off tube 62, and the tube 62 becomes conductive. The tube 64 will simultaneously cease to conduct. Current will flow in the relay coil 66 for the purpose of actuating a relay, as will be described hereinafter. The negative-going pulse 88, applied to the grid of the tube 72, will not cause the tube 72 to conduct. The relay coil 76, therefore, will not conduct current, and its associated relay will not be actuated.

Referring now to Fig. 3 there are shown the relay coils 66 and 76 and their associated relays. The relay associated with the relay coil 66 comprises a two-position relay 90 that is effectively a two-position double-pole-double-throw switch. The relay associated with the relay coil 76 is a two-position relay 92 that is also effectively a double-pole-double-throw switch. The relays 90 and 92 are shown in deenergized positions, as when the coils 66 and 76 are deenergized.

A relay 94 that is effectively a single-pole-single-throw switch is actuated by a relay coil 96 for the purpose hereinafter appearing. The relay 94 is shown in a deenergized position.

Referring now to Fig. 2 there are shown means for obtaining the envelope of the signal whose change in frequency is to be determined. The signal whose change in frequency is to be determined, such as the signal 80 in Fig. 5A, is applied to the input terminals 100 and 102. The terminal 100 is a common terminal and is connected to the common terminals 14 and 52. The input signal is amplified by an amplifier circuit 104, and the output of this circuit is amplified further in an amplifier circuit 106. The output of the amplifier circuit 106 is capacitively coupled to a double-diode circuit 108 comprising a diode 110 and a diode 112.

The diodes 110 and 112 are connected back-to-back. The anode of the diode 110 is connected in the cathode circuit of a normally cut-off tube 114. The cathode of the diode 112 is connected to the grid of the normally cut-off tube 114. A capacitor 116 is connected in shunt with a cathode resistor 118, in the circuit of the diode 112, to provide a positive envelope of the signal at the cathode of the diode 112. The tube 114 is biased so that it is made conductive when a predetermined threshold voltage of the positive envelope of the input signal is reached. A normally conducting tube 120, in parallel with the tube 114, is connected in a manner to be triggered off when the tube 114 is made conductive. The tube 120 provides a balanced load on the power supply when the tube 114 is not conducting. The anode of the tube 114 is connected to a source of operating potential through the relay coil 96.

It will now be understood that an audio signal, for example, applied between the input terminals 100 and 102 will provide a positive envelope at the cathode of the diode 112, and that a predetermined amplitude of this positive envelope will trigger "on" the normally cut-off tube 114. Thus, when a signal, such as the signal 80 of Fig. 5A, is applied between the input terminals 100 and 102, a positive envelope 122, as shown by the dashed line in Fig. 5A, is obtained at the cathode of the diode 112. Current through the tube 114 energizes the relay 96, and causes the tube 120 to cease conduction.

Referring now to Fig. 3 there is shown an output circuit, or coder, of the signal frequency change detector interconnected with the relays 90, 92, and 94. The relay 94 and its actuating coil 96 comprise means for connecting or interrupting the output circuit by connecting or interrupting the common connection 122 to the output circuit leads 124 and 126. The common connection 122 is connected to the common terminals 14, 52, and 100.

The pole 128 of the relay 94 is moved to the contact 130 when the relay coil 96 is energized. When the relay coil 96 is deenergized, the common connection 122 is broken through the relay 94. When the relay coil 66 of the relay 90 is deenergized, a pole 132 touches a contact 134, the latter being connected to the contact 130 of the relay 94. A pole 136 of the relay 90 is disconnected from the contact 130 of the relay 94 when the relay 90 is deenergized. Upon energizing the relay coil 66, the pole 132 is disconnected from the contact 130 of the relay 94, and the pole 136 of the relay 90 is connected to the contact 130 of the relay 94.

The pole 136 of the relay 90 is connected to a contact 138 of the relay 92. The pole 132 of the relay 90 is connected to a contact 140 of the relay 92. A pole 142 of the relay 92 is connected to the output lead 124, and a pole 144 is connected to the output lead 126. When the relay 92 is energized, the pole 142 is connected to the relay contact 130 in the relay 94, and the pole 144 is disconnected from the relay contact 130 of the relay 94 and connected to the pole 136 of the relay 90.

The operation of the coder for the frequency change detector of Fig. 3 will now be explained. Let it be assumed that each of the output leads 124 and 126 are connected to separate indicating means, such as a lamp and a battery (not shown), for example, that are also in a series circuit with the common connection 122. In the absence of any sound signal, the relay coil 96 will be deenergized, and the common lead 122 will be disconnected, through the relay 94, from the output leads 124 and 126. Any indicating means in the output leads 124 and 126 will then be inoperative. This condition, of no sound, may provide a code of two unlighted lamps, for example. This code is represented by two small circles, as indicated in Fig. 4.

With an increase in the frequency of a signal, such as the signal 80 in Fig. 5A, the coil 96 is energized and the common lead 122 is connected to the contact 130 through the pole 128 of the relay 94. With a signal of increasing frequency the relay coil 66 is also energized. The coil 76, however, is deenergized, and the relay 92 is unaffected. Under these conditions, the lead 126 is connected to the common lead 122, but the lead 124 is disconnected from the common lead 122. If the output indicators are lamps, a first lamp will be lighted and a second lamp will be out, as shown in Fig. 4. A lighted lamp is shown in Fig. 4 by a solid circle.

Let it be assumed that a signal decreases in frequency from a frequency $f_3$ to a relatively lower frequency $f_4$. The positive and negative envelopes 150 and 152 of this signal will provide differentiated impulses 154 and 158 of negative-going and positive-going polarities, respectively, as shown in Fig. 5C. The negative-going impulse will not trigger the tube 62, of Fig. 1, and the relay coil 66 will remain deenergized. The positive-going impulse, however, will trigger the tube 72 "on" and energize the relay coil 76. The positive envelope of the signal will also actuate the relay 94. Under these conditions of decreasing frequency, it will be understood that the output lead 126 will be disconnected from the common connection 122, and the output lead 124 will be connected to the common connection 122. This may cause a first lamp to be extinguished and a second lamp to be lighted, as shown by the code in Fig. 4.

If a signal comprises waves of a steady frequency, only the relay coil 96 will be energized and the common connection 122 will be connected to the output leads 124 and 126. This will result in energizing the output leads 124 and 126 so that both indicating means will be energized. The code for this condition is indicated by two solid circles in Fig. 4.

It will be noted that the relay 94 may be omitted, and that the common terminal 122 may be connected to the relays 90 and 92 directly, as though the relay 94 were shorted. Under these conditions, however, the inherent rise and fall at the beginning and end of the envelopes of most signals may produce unwanted impulses, such as the impulses associated with the beginning and end of the envelopes 82 and 84 in Fig. 5B. These impulses, however, may not be objectionable, and may be tolerated in certain applications of signal analyses.

The values associated with the components in the drawings relate to a satisfactory embodiment of the invention, and are not to be construed in a limiting sense.

What is claimed is:

1. Means for indicating a change in the frequency of a signal comprising means to limit the amplitude of said signal to waves of a constant amplitude, means to derive positive and negative pulses from each of said waves proportional in frequency to the frequency of said waves, means to obtain the positive and negative envelopes of said positive and negative pulses, means to derive impulses from each of said envelopes when there is a change in the amplitude of said envelopes, an output circuit comprising a pair of relays, and means to apply said impulses from said positive and negative envelopes to each relay of said pair of relays respectively for altering said output circuit in response to the polarity of said impulses.

2. Means for indicating the direction of change in frequency in a signal having more than one frequency comprising means to limit the amplitude of said signal to waves of a constant amplitude, means to derive positive and negative pulses from each of said waves proportional in frequency to the frequency of said waves, means to obtain the positive and negative envelopes of said positive and negative pulses, means to differentiate said positive and said negative envelopes to derive impulses indicative of a change in amplitude of said envelopes, an output circuit comprising a pair of interconnected relays, and means to apply said impulses from said positive and negative envelopes to each relay of said pair of relays respectively to actuate said relays in response to said impulses of one polarity.

3. Means for indicating the direction of change in frequency in a signal having more than one frequency comprising means to limit the amplitude of said signal to waves of a constant amplitude, means to derive positive and negative pulses from each of said waves proportional in frequency to its frequency, means to obtain the positive and negative envelopes of said positive and negative pulses, means to differentiate said positive and said negative envelopes to derive impulses indicative of a change in amplitude of said envelopes, and output circuit comprising a pair of interconnected relays, means to apply said impulses from said positive and negative envelopes to each relay of said pair of relays respectively, each of said relays being energized by said impulses of one polarity only.

4. Apparatus for indicating a change in the frequency of a signal comprising means to limit the amplitude of said signal to waves of a constant amplitude, means to derive positive and negative pulses from each of said waves proportional in frequency to its frequency, means to obtain positive and negative envelopes from said positive and negative pulses respectively, means to derive impulses from each of said envelopes when there is a change in the amplitude of each of said envelopes, an output circuit comprising at least two interconnected two-position relays, means to apply said impulses from said positive envelope to one of said two relays, means to apply said impulses from said negative envelope to the other of said two relays, and means responsive to the beginning and to the end of said signal to interrupt said output circuit.

5. Apparatus for indicating a change in the frequency of a signal comprising means to limit the amplitude of said signal to waves of a constant amplitude, means to derive positive and negative pulses from each of said waves proportional in frequency to the frequency of said waves, means to obtain positive and negative envelopes from said positive and negative pulses respectively, means to derive impulses from each of said envelopes when there is a change in the amplitude of said envelopes, an output circuit comprising at least two interconnected relays each operable in response to impulses of one polarity, means to apply said impulses from said positive envelope to one of said two relays, means to apply said impulses from said negative envelope to the other of said two relays whereby said output circuit may be completed or interrupted in accordance with the operating conditions of said relay.

6. Apparatus for indicating a change in the frequency of a signal comprising means to limit the amplitude of said signal to waves of a constant amplitude, means to derive positive and negative pulses from each of said waves proportional in frequency to its frequency, means to obtain positive and negative envelopes from said positive and negative pulses respectively, means to derive impulses from each of said envelopes when there is a change in its amplitude, means to detect the envelope of said signal, an output circuit comprising a plurality of output leads and at least two interconnected relays each operable in response to impulses of one polarity, means to apply said impulses from said positive envelope to one of said two relays, means to apply said impulses from said negative envelope to the other of said two relays, whereby said output circuit may be completed to predetermined ones of said output leads in accordance with the operating conditions of said relays, and switching means connected in series with said output circuit and responsive to a predetermined threshold value of said envelope of said signal to make or break said circuit means.

7. Apparatus for indicating a change in the frequency of a signal comprising means to derive a set of two impulses from said signal when there is a change in its frequency, one of said set of two impulses being derived from the positive portion of said signal and the other of said set of two impulses being derived from said negative portion of said signal, at least two interconnected relays each having actuating means, means to apply said one impulse to said actuating means of one of said relays, means to apply said other impulse to said actuating means of the other of said relays, and output circuit means connected to said relays for indicating the direction of change in the frequency of said signal in accordance with the operating condition of each of said relays.

8. Apparatus for indicating a change in the frequency of a signal comprising means to derive a set of two impulses from said signal when there is a change in its frequency, one of said set of two impulses being derived from the positive portion of said signal and the other of said set of two impulses being derived from said negative portion of said signal, at least two interconnected relays each having actuating means, each of said relays being actuated by impulses of the same polarity, means to apply said one impulse to said actuating means of one of said relays, means to apply said other impulse to said actuating means of the other of said relays, output circuit means connected to said relays for indicating the direction of change in the frequency of said signal in accordance with the operating condition of each of said relays, and means included in said output circuit means to energize said output circuit means in response to a threshold amplitude of said signal.

9. Apparatus for indicating a change in the frequency of a signal comprising means to derive a set of two impulses of opposite polarity from said signal when there is a change in the frequency of said signal, one of said set of two impulses being derived from the positive portion of said signal and the other of said set of two impulses being derived from the negative portion of said signal, an output circuit comprising at least two interconnected relays and at least two output leads, means to energize one of said output leads when one of said two impulses is of one polarity, and means to energize the other of said output leads when said one of said two impulses is of an opposite polarity.

10. Apparatus for indicating a change in the frequency of a signal comprising means to derive a set of two impulses of opposite polarity from said signal when there is a change in the frequency of said signal, one of said set of two impulses being derived from the positive portion of said signal and the other of said set of two impulses being derived from the negative portion of said signal, an output circuit comprising at least two interconnected relays and at least two output leads, means to energize one of said output leads when one of said two impulses is of one polarity, means to energize the other of said output leads when said one of said two impulses is of an opposite polarity, and means to interrupt said output circuit at substantially the beginning and at the end of said signal.

11. Apparatus for indicating a change in the frequency of a signal comprising means to derive a set of two impulses of opposite polarity from said signal when there is a change in the frequency of said signal, one of said set of two impulses being derived from the positive portion of said signal and the other of said set of two impulses being derived from the negative portion of said signal, an output circuit comprising at least two interconnected relays and at least two output leads, means to energize one of said output leads when one of said two impulses is of one polarity, means to energize the other of said output leads when said one of two impulses is of an opposite polarity, and means to energize both of said output leads in the absence of a change in frequency of said signal.

12. Apparatus for indicating a change in the frequency of a signal comprising means to derive a set of two impulses of opposite polarity from said signals when there is a change in the frequency of said signal, one of said set of two impulses being derived from the positive portion of said signal and the other of said set of two impulses being derived from the negative portion of said signal, an output circuit comprising at least two interconnected relays comprising at least two output leads, means to energize one of said output leads when one of said two impulses is of one polarity, means to energize the other of said output leads when said one of two impulses is of an opposite polarity, means to energize both of said output leads in the absence of a change in frequency of said signal, and means to interrupt said output circuit at substantially the beginning and end of said signal.

References Cited in the file of this patent
UNITED STATES PATENTS

| | | |
|---|---|---|
| 2,604,518 | Oliver | July 22, 1952 |
| 2,755,378 | Stover | July 17, 1956 |
| 2,794,974 | Bagno et al. | June 4, 1957 |